Figure 1:
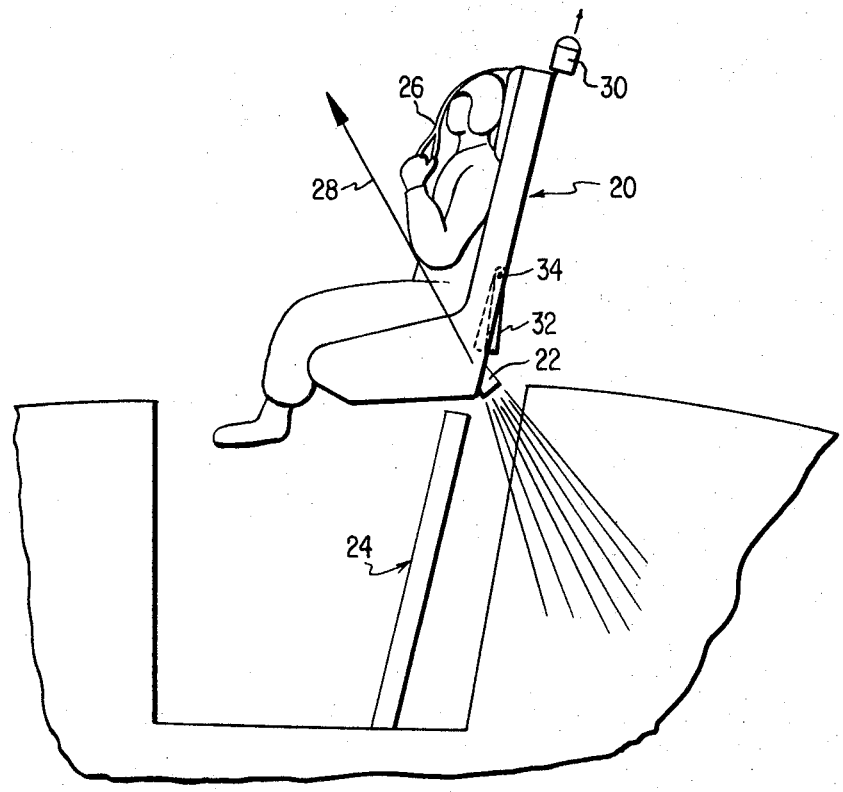

United States Patent [19]
Stencel

[11] 3,726,499
[45] Apr. 10, 1973

[54] METHOD OF DEPLOYING A PARACHUTE BY A ROCKET UNDER LOW SPEED CONDITIONS

[75] Inventor: Fred B. Stencel, Asheville, N.C.

[73] Assignee: Stencel Aero Engineering Corporation, Asheville, N.C.

[22] Filed: May 11, 1971

[21] Appl. No.: 142,288

[52] U.S. Cl..............244/141, 244/122 AD, 244/149
[51] Int. Cl..........................B64d 25/10, B64d 17/72
[58] Field of Search....................244/142, 138, 141, 244/122 AD, 122 R, 122 AH, 122 AE, 122 A, 147, 148, 149, 152; 239/265.15

[56] References Cited

UNITED STATES PATENTS

| | | | |
|---|---|---|---|
| 3,186,662 | 6/1965 | Martin | 244/122 AD |
| 3,433,440 | 3/1969 | Stanley | 244/122 AD |
| 3,642,236 | 2/1972 | Stanley | 244/138 R |

*Primary Examiner*—Milton Buchler
*Assistant Examiner*—Carl A. Rutledge
*Attorney*—Roylance, Abrams, Berdo & Kaul

[57] ABSTRACT

A parachute development system as described in copending application Ser. No. 848,932 now U.S. Pat. No. 3,595,501 uses as a pilot parachute to orient a rocket in the airstream so that when the rocket is fired downstream, it deploys the main parachute. The invention herein accomplishes orientation of the rocket rapidly and without the use of the pilot parachute under low speed conditions, by releasing the rocket to trail behind the load which is being accelerated in an upstream direction in the airstream.

1 Claim, 6 Drawing Figures

PATENTED APR 10 1973 3,726,499

SHEET 1 OF 4

INVENTOR
FRED B. STENCEL

BY  Rayloner, Abrams, Berdo & Kaul

ATTORNEYS

INVENTOR
FRED B. STENCEL

INVENTOR
FRED B. STENCEL

METHOD OF DEPLOYING A PARACHUTE BY A ROCKET UNDER LOW SPEED CONDITIONS

This invention relates to a method for deploying a parachute and more particularly it relates to a method for parachute deployment by a rocket under low speed conditions.

In copending U.S. application Ser. No. 848,932, of which applicant is a co-inventor, and which application is commonly assigned with this application, there is described a parachute deployment system which incorporates a rocket that fires in a downstream direction to extract and deploy the parachute. The parachute is, of course, connected to the load, and the rocket is attached between the parachute and a pilot parachute. The pilot parachute is released into the airstream and when its canopy inflates, it exerts an aerodynamic drag force on the rocket to move the same into the airstream and to orient the rocket in a downstream direction within the airstream. A control means is provided to prevent the rocket from igniting until a predetermined condition, such as a time lapse, has occurred. When this preselected condition occurs, a release means frees the control means and enables the rocket to ignite, whereupon the rocket is propelled downstream to extract the parachute from its container and deploy the parachute into the airstream in a downstream direction.

While the arrangement described in the foregoing patent application operates satisfactorily under most conditions normally encountered, it has been found that it normally requires 0.5 seconds to accomplish aerodynamic orientation of the rocket in the airstream by the pilot parachute. That is, after the pilot parachute is released into the airstream, and its container is stripped away, and the aerodynamic drag forces inflate the pilot parachute canopy and cause the same to exert an aerodynamic drag force upon the rocket to move the rocket into the airstream in a downstream-oriented position, a time of approximately 0.5 seconds will have elapsed. In certain conditions or situations, a time lapse of 0.5 seconds cannot be tolerated, and accordingly, it becomes necessary to provide a method and means for deploying the parachute more rapidly.

One such condition which might require a more rapid deployment of the parachute is in a case of a VTOL aircraft. In such aircraft, if there is a dangerous emergency condition shortly after takeoff, the forward air speed of the aircraft might be 30 knots or less. If there is a failure of the VTOL engine thrust, accompanied by the normal delay in the pilot reaction time before accomplishing an ejection from the disabled aircraft, it is entirely possible that the sink rate of the aircraft will cancel the vertical velocity component of the ejection seat. That is, if the damaged VTOL aircraft was sinking at a rate of 64 feet per second and the pilot ejected upwardly at a rate of 64 feet per second, the relative air speed of the man-seat combination would be zero. Under such circumstances, it would not be possible to get an aerodynamic deployment of the pilot parachute until the man-seat combination started to fall and gather speed as it entered a free-fall toward the ground. At that time, the aerodynamic forces would be sufficient to inflate the pilot parachute which, in turn, would orient the rocket downstream and the rocket, in turn, would fire to deploy the main canopy into the airstream. Then, the main canopy would have to inflate in the airstream in order to support the man-seat combination. In such a situation, it is entirely possible that the foregoing sequence of events could not take place before the man-seat combination crashed into the ground. Another example where a delay time in accomplishing parachute deployment could be unsatisfactory is where an aircraft encounters difficulty or failure when taking off from the deck of an aircraft carrier. In such event, only a short period of time exists in which an adequate ejection can be accomplished prior to the plane crashing into the sea.

Under the circumstances, although the system described in detail in aforementioned patent application Ser. No. 848,932 does provide a most superior improvement over existing forms of technology, it is nevertheless recognized that under certain situations, the apparatus of that aforementioned application cannot and does not operate quickly enough to accomplish deployment. These conditions are situations which could generally be described as low speed situations where the aircraft or the load to be supported by the parachute are moving at a rate of less than 50 knots. It is the object of the present invention to provide a method for permitting a very rapid deployment of the parachute under such low speed conditions.

It is a further object of the present invention to provide a specific improvement which permits the apparatus and system described in the aforementioned patent application to operate to accomplish a more rapid deployment under low speed conditions, without materially altering either the system or any of the hardware components thereof.

Other objects, advantages and salient features of the present invention will become apparent from the following detailed description which, taken in conjunction with the annexed drawing, discloses a preferred embodiment thereof.

The foregoing objects are attained by providing an additional operational mode in the system of the aforementioned application, such mode permitting parachute deployment to occur completely within approximately 0.4 seconds and to occur completely independently of the air velocity of the load. This is accomplished by releasing the rocket, which is freely pivotally mounted at its lower end to the load, immediately after the catapult tubes for the ejecting load separate from one another. At this time, the seat rocket will ordinarily be propelling the seat in a forward and upward direction along an acceleration axis. Since the seat is traveling upstream along this axis, and since the rocket has been released, the rocket itself will pivot inertially to assume a downstream orientation behind the seat. This will occur almost instantaneously, even before the drogue or pilot parachute has inflated. Then, the rocket is fired in a downstream direction along the acceleration axis and as it is propelled downstream it deploys the parachute out of its container and into the airstream. Such deployment occurs even before the pilot or drogue parachute has a chance to become inflated into the airstream.

Figure 4:
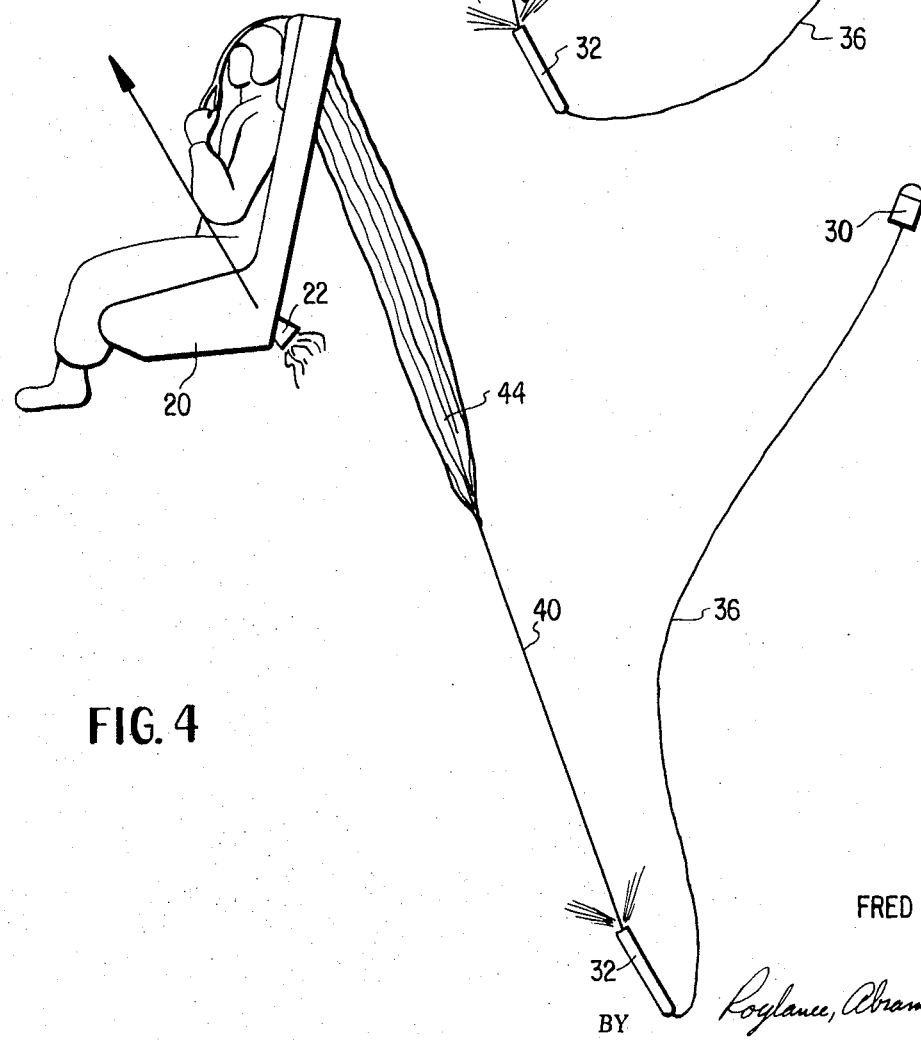
Figure 5:
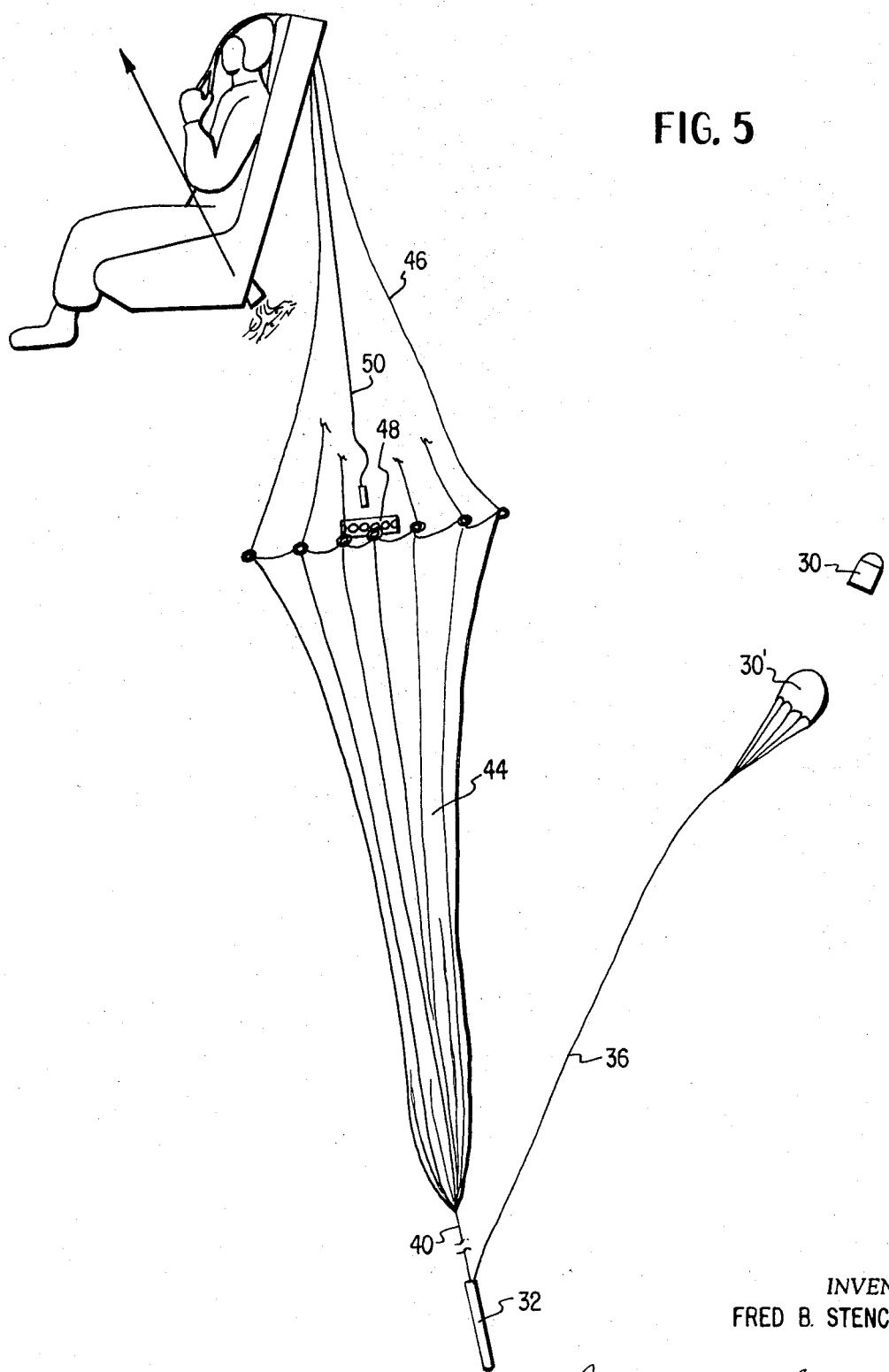
Figure 6:
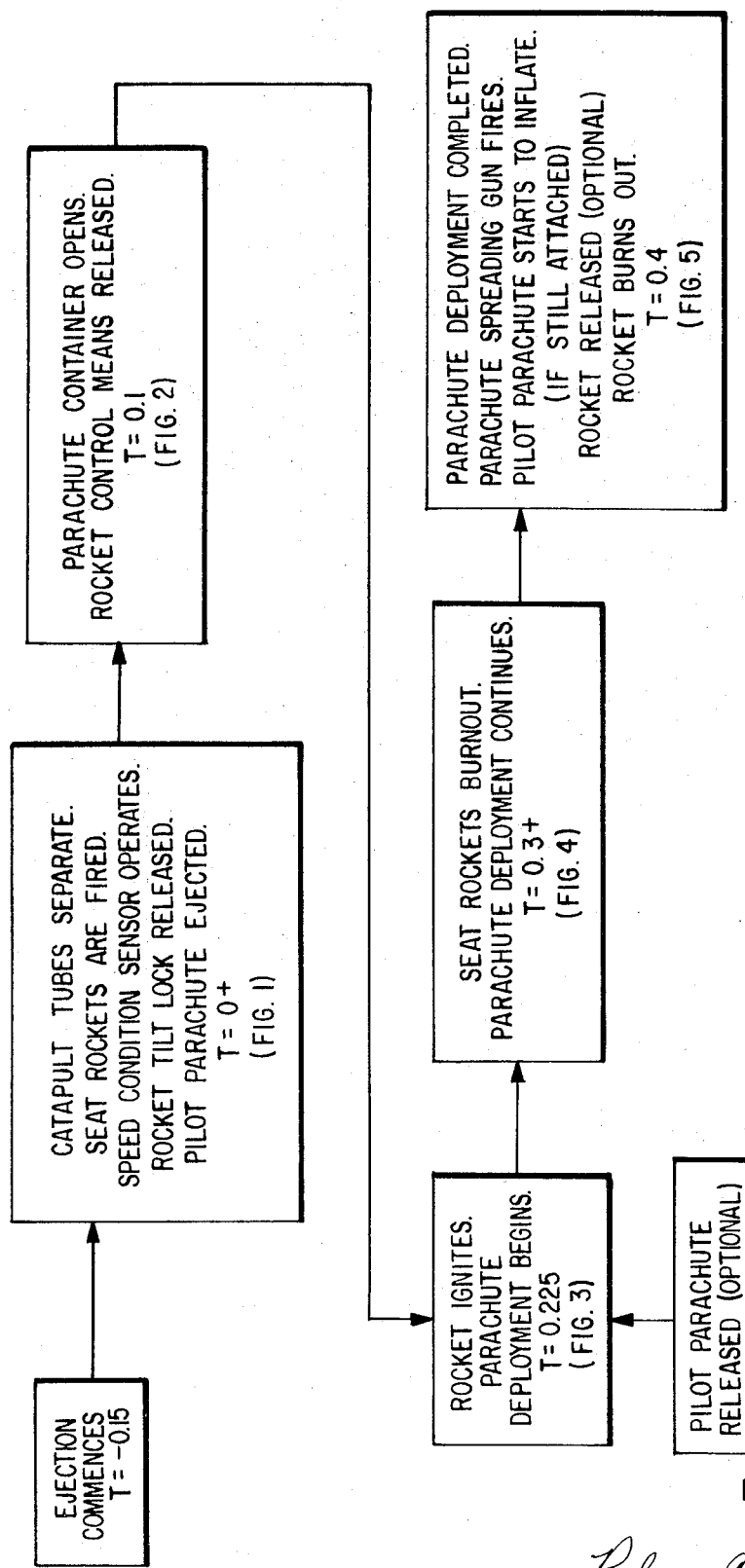

Referring now to the drawings which form a part of this original disclosure:

FIGS. 1–5 are diagrammatic elevational views illustrating, in progressive sequence, the manner in which the system and method of the present invention operates, and FIG. 6 is a block diagram which schematically indicates the steps involved in the method.

Referring now to the present invention in further detail, it will be understood that the entire disclosure of aforementioned application Ser. No. 848,932 is hereby incorporated herein by reference. As a result, although many details of the hardware will not be disclosed herein, it will be understood that such details are analogous to those disclosed in the aforementioned application.

Referring now to FIG. 1, there is shown therein an ejection seat generally designated 20 of the type which includes a seat mounted thrust rocket means 22 and an ejection catapult 24. The construction of the seat can be like those disclosed in U.S. Pat. No. 3,525,490, issued Aug. 25, 1970 or U.S. Pat. No. 3,542,319 issued Nov. 24, 1970, both of which are assigned to the assignee of the present application. Additionally, such seat can incorporate a seat stabilization device which is that disclosed in U.S. Pat. No. 3,103,331, issued Sept. 10, 1963 or U.S. Pat. No. 3,387,803, issued June 11, 1968, both assigned to the assignee of the subject application. However, since the seat stabilization device does not form any specific part of the present invention, the details thereof are not shown or described herein.

The occupant of the seat 20 has just commenced an ejection in FIG. 1, which is accomplished by pulling the face curtain forwardly and downwardly, as is well known in the ejection seat art. Just as the catapult tubes 24 separate at the commencement of the ejection operation, the seat rockets 22 are fired to thrust the seat forwardly or upstream along an acceleration axis indicated as 28.

Before this time but not later than at this point, a conventional sensing means operates to sense a condition typical to an air speed of less than 50 knots. Sensing of this condition can occur in several known fashions. For example, mere sensing of whether the landing gear for the aircraft from which the seat 24 has ejected can be sufficient, since, if the landing gear is still down, this could be indicative of the fact that the air speed of the aircraft is still low. A simple manual sensing technique would simply require that the pilot operate a switch when the aircraft has exceeded an air speed of 50 knots. If the pilot has not already activated this switch prior to ejection, then the system will sense that the plane is operating under a condition typical to an air speed of less than 50 knots. Another possible means for sensing this condition would be if the engine thrust angle was diverted to a certain degree or not. Still a further means for sensing this condition would be a simple air speed sensing device.

In any event, the present invention will only operate if the system senses a condition typical to an air speed of less than 50 knots, in which case the present invention will operate to accomplish an ultra-fast deployment of the parachute. In the event that the system would not sense the condition typical to the air speed of less than 50 knots, as would be the case if the aircraft were traveling, for example, at 150 knots, then the system would continue to operate exactly in the manner described in the aforementioned application.

Continuing with FIG. 1, in the instance where there is a sensing that the speed condition is less than 50 knots, the two separate acts occur. First, the drogue or pilot parachute and its associated container 30 are ejected out of the housing at the upper rear of the ejection seat. Additionally, the tilt lock for the rocket 32 is released. That is, the rocket 32 is pivotally attached at its rear or firing end by a swingable gimbal arrangement 34, which functions as the control means for preventing deployment of the rocket. The opposite end of the rocket 32 is initially locked so that the rocket stays nested along the back of the ejection seat 20, but when the condition of FIG. 1 is reached, this lock is released thus permitting the rocket 32 to start to swing to the position shown therein.

Figure 2:
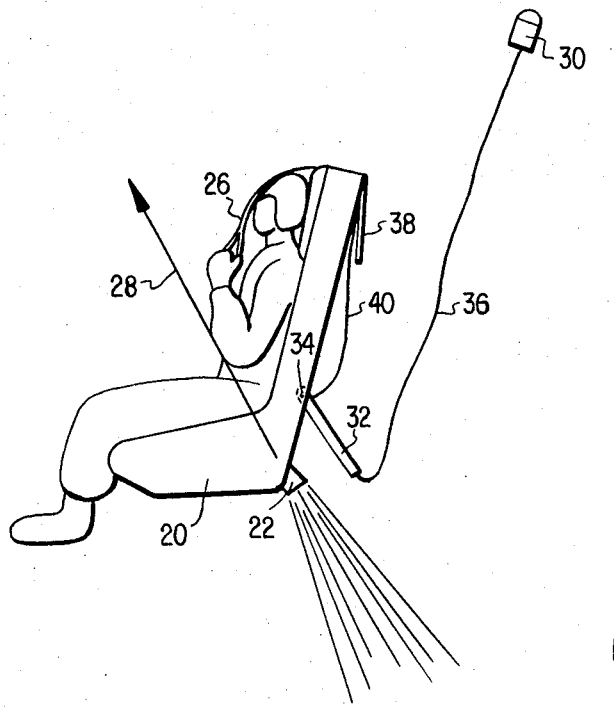

Referring now to FIG. 2 the drogue or pilot parachute 30 in its container has been released into the air though the line 36 between the same and the end of the rocket still remains slack. The rocket 32 has pivoted to a position behind the seat where it is aligned along an axis generally parallel to the axis of acceleration 28. The parachute container on the back of the seat is released, as by releasing a door 38 and the line 40 between the opposite end of the rocket and the main canopy itself is freed. The seat rocket 22 continues to burn and thrust thus accelerating the seat along the axis 28.

Figure 3:
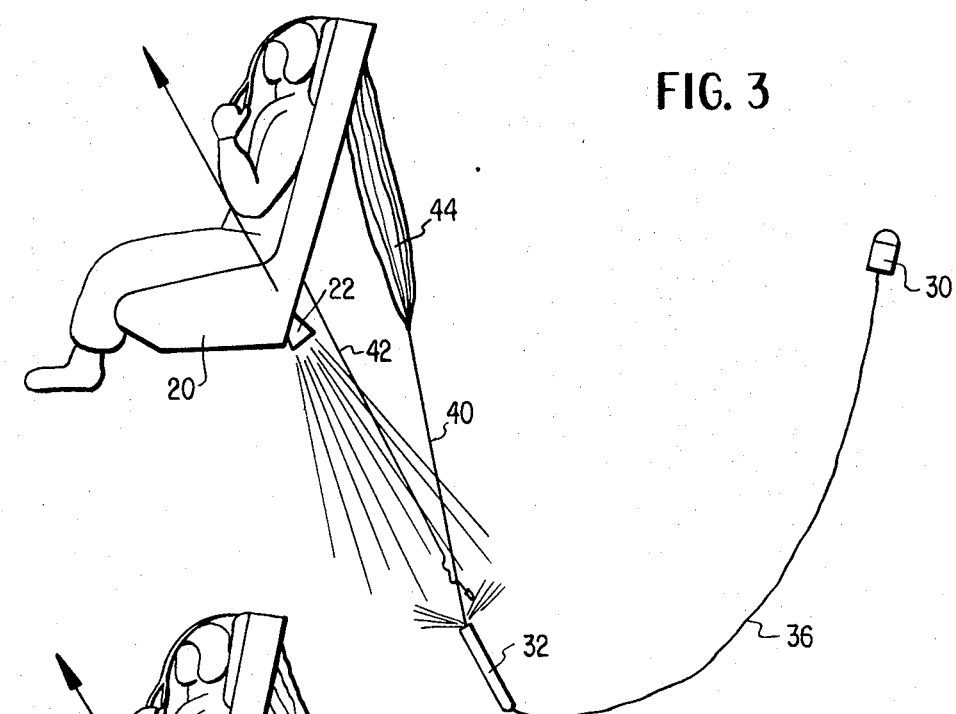

At some point between the position of FIG. 2 and the position of FIG. 3, the control means 34 is released. Any known technique of sequencing can be used to release the pivot control means 34, but when the same is released, the rocket 32 is no longer pivotally attached to the seat 30 and instead can move out into the airstream in a downstream direction, simply through inertial forces and the drag applied thereto by the accelerating seat. When the rocket 32 reaches the position of FIG. 3 it can be fired as, for example, by a control line 42. Such firing or igniting of the rocket will, of course, cause the same to be propelled in a downstream direction in opposition to the upstream traveling force of the seat along the axis 28. The line 40 between the tail of the rocket and the main canopy 44 for the parachute pulls taut and the canopy 44 starts to extract from its container. It will be noted that at this point the drogue or pilot parachute 30 and its line 36 have still not become fully aligned in the downstream direction in the airstream. At this point, if desired, a line cutter can be used to simply sever the line 36 from the nose of the rocket 32 in a manner described in the aforementioned patent application. Severing the pilot parachute at this point in the sequence is permissible since the pilot parachute will not perform any useful function during this type of parachute deployment method.

Continuing to FIG. 4 of the drawings, the seat rocket 22 has burned out and the rocket 32, now ignited, is propelling in a downstream direction toe extract the main canopy 44 fully from its housing. The line 35 and its attached pilot or drogue parachute 30 is now disposed in the manner shown, if the same is still attached to the rocket 32.

Finally, in FIG. 5, the rocket 32 has traveled completely downstream and it now burns out. The line 40 from the rocket has completely extracted the main canopy into the airstream in a downstream direction and the suspension lines 46 from the canopy remain connected to the load. The mouth of the main canopy is initially reefed by a reefing device such as a ballistic spreading gun 48 of the type shown and described in U.S. Pat. No. 3,281,098, issued Oct. 25, 1966, and assigned to the assignee of this application. A center firing line 50 has pulled taut to fire the spreading device 48 to commence ballistic spreading of the canopy. If the drogue or pilot parachute is still attached to the rocket, the container 30 will have at this point stripped away and the pilot parachute canopy 30' will have started to inflate in the airstream. Again, at this point, a line cutter can be used to sever the line 40 to detach both the rocket and the pilot parachute since they have served their function of rapidly and effectively employing the main parachute into the airstream.

Referring now to FIG. 6, such figure is a schematic block diagram illustrating the steps and the timing sequence which occurs in the method of the present invention. In the first block, where the time T is equal to −0.15 seconds, the pilot has just commenced the ejection sequence for the seat 20, presumably because the aircraft in which the seat is mounted has encountered some type of difficulty. Moving to the next block in the diagram which describes the operation shown in FIG. 1 of the drawings herein the time is at some point defined as zero. At that time, the ejection sequence will have occurred at least to the extent of firing the catapult to the point where the catapult tubes have separated, and firing the seat rockets 22 to propel the seat in an accelerating fashion in an upstream direction in the airstream. Before this event but not later than this point, the speed condition sensor operates and if such sensor recognizes that the condition is typical of that of an air speed over 50 knots, then nothing further occurs and the systems operates in the manner described in the aforementioned patent application. That is, the pilot parachute is deployed into the airstream, becomes aligned in the airstream and aerodynamically aligns the rocket in the airstream, while at the same time the control means prevents the aerodynamic drag on the rocket from being transmitted directly to the main canopy. Assuming, however, in the block diagram of FIG. 6 that the sensors sense a condition typical of that less than an air speed of 50 knots, then the pilot parachute starts to be ejected and the rocket tilt lock is released.

Moving on to the next block in the diagram of FIG. 6, namely, that associated with FIG. 2, the parachute container opens and the rocket control means is released since at this point the rocket has become aligned inertially in the airstream behind the seat. Release of the control means enables the rocket to separate from the seat. The time elapsed at this point is 0.1 seconds.

Continuing to the next block in the block diagram of FIG. 6, the rocket 32 is ignited, the line 40 from the rocket 32 to the main canopy 44 is pulled taut and deployment of the main canopy 44 begins. The time elapsed at this point is 0.225 seconds.

Continuing to the next block of the diagram, namely, that associated with FIG. 4 of the drawings, the seat rockets 22 have burned out so that the blast therefrom will not in any way damage the fabric of the main canopy 44. The rocket is of course being propelled in a downstream direction under the thrusting action of its motor and such propulsion is causing the main canopy to be extracted from its housing or container. The time elapsed at this point is somewhat greater than 0.3 seconds but less than 0.4 seconds.

Finally, continuing to the last block of the diagram of FIG. 6, namely, that associated with FIG. 5, the deployment of the parachute has been completed and the parachute spreading gun has been fired to commence spreading of the main canopy. The pilot parachute starts to inflate at this point, if the same remains attached to the rocket, although inflation of the pilot parachute does not serve any useful purpose at this point. The rocket 32 is now burnt out and may be released since it has accomplished its purpose of deploying the main canopy into the airstream. At this point 0.4 seconds have elapsed and the main canopy has been completely deployed and its mouth spread open in the airstream. In contrast, operating in the mode of operation described in the aforementioned patent application, the sequence of operations would just be beginning because of the inflation of the pilot parachute canopy.

After reading the foregoing detailed description, it should be apparent that the objects set forth at the outset hereof have been successfully achieved by the present invention. Accordingly,

What is claimed is:

1. In a parachute deployment system including a load, means for accelerating the load in an upstream direction in the airstream, a parachute attached to the load, a rocket attached to the parachute for deploying the parachute into the airstream in a downstream direction, and a pilot parachute attached to the rocket for ordinarily orienting the rocket in the downstream direction, the improvement in the method of deploying the parachute which comprises the steps of:

accelerating the load in an upstream direction in the airstream;

sensing a condition typical to an air speed of less than 50 knots;

releasing the rocket in response to said sensed condition to permit said rocket to move into the airstream in a downstream direction prior to inflation of the pilot parachute, while simultaneously continuing to accelerate the load in the upstream direction in the airstream; and firing the rocket to propel the rocket downstream in the airstream to deploy the parachute into the airstream prior to inflation of the pilot parachute.

* * * * *